US006308934B1

(12) United States Patent
Gallo

(10) Patent No.: US 6,308,934 B1
(45) Date of Patent: Oct. 30, 2001

(54) PRY BAR WITH BUILT IN HAMMER AND NAIL REMOVER

(76) Inventor: Mark Anthony Gallo, 8 Arlene Grove, Lodi, NJ (US) 07644

(*) Notice: Subject to any disclaimer, the term of this patent is extended or adjusted under 35 U.S.C. 154(b) by 0 days.

(21) Appl. No.: 09/613,271

(22) Filed: Jul. 10, 2000

(51) Int. Cl.$^7$ .................................................. B23P 19/04
(52) U.S. Cl. ................................ 254/25; 254/21; 254/24
(58) Field of Search ................................ 254/21, 25, 20, 254/18, 17, 131, 131.5, 24

(56) References Cited

U.S. PATENT DOCUMENTS

| | | | | |
|---|---|---|---|---|
| 103,330 | | 5/1870 | Heusser . | |
| D. 136,557 | | 10/1943 | Scown . | |
| D. 272,712 | | 2/1984 | Allen . | |
| 870,672 | | 11/1907 | Frink et al. . | |
| 1,135,105 | | 4/1915 | Glafke . | |
| 1,467,914 | * | 9/1923 | Balcom | 254/25 |
| 1,709,240 | * | 4/1929 | Wass | 254/25 |
| 2,103,008 | | 12/1937 | Kinast . | |
| 2,325,227 | * | 7/1943 | Chaddock | 254/25 |
| 3,029,502 | * | 4/1962 | Middaugh | 254/25 |
| 3,169,010 | | 2/1965 | Crawford, Jr. . | |
| 3,568,657 | | 3/1971 | Gue . | |
| 3,680,834 | | 8/1972 | Holloway . | |
| 4,182,390 | | 1/1980 | Renner . | |
| 4,464,819 | * | 8/1984 | Steck et al. | 254/25 |
| 4,991,892 | * | 2/1991 | Gordon et al. | 254/131 |
| 5,010,791 | | 4/1991 | Williams . | |
| 5,109,739 | | 5/1992 | Hull et al. . | |
| 5,322,264 | * | 6/1994 | Giambro | 254/25 |
| 5,577,711 | | 11/1996 | Shine . | |
| 5,695,171 | | 12/1997 | Shine . | |
| 5,695,172 | * | 12/1997 | Hreha | 254/21 |
| 5,938,177 | * | 8/1999 | Fonda | 254/25 |
| 6,158,100 | * | 12/2000 | Peterson et al. | 254/25 |

* cited by examiner

*Primary Examiner*—Joseph J. Hail, III
*Assistant Examiner*—Lee Wilson
(74) *Attorney, Agent, or Firm*—Richard M. Goldberg

(57) ABSTRACT

A pry bar with a built in hammer includes a slide bar including an elongated linear section, a first pry section at a first end of the elongated linear section and angled relative thereto, the first pry section including a front edge with a first notch therein, a side edge which meets the front edge at a corner, a second notch at the side edge immediately adjacent the corner, and a nail entrapment notch in the side edge, and a second pry section at a second end of the elongated linear section and angled relative thereto, the second pry section including a front edge with a notch therein; a first stop fixed to the elongated linear section adjacent the first pry section; a second stop fixed adjacent to the elongated linear section adjacent the second pry section; and a slide hammer slidably mounted on the elongated linear section between the first and second stops in order to impact against the first stop.

20 Claims, 4 Drawing Sheets

PRY BAR WITH BUILT IN HAMMER AND NAIL REMOVER

BACKGROUND OF THE INVENTION

The present invention relates generally to a tool for use in roofing, and more particularly, is directed to a pry bar with a built in hammer and nail remover for use in roofing.

It is known that roofs are covered with at least one layer of shingles nailed onto the roofs. The shingles are covered at edges of the roof by metal flashing. Flashing is typically nailed into place, partially covering the edges of the shingles, and may be caulked by tar or other sealing materials. When applying a new layer of shingles on an existing roof, either by covering an existing layer of shingles or by removing all existing layers of shingles and then replacing the same by the new layer of shingles, it is necessary to lift up the flashing at the edges of the roof in order to remove the shingles beneath the flashing and insert the new layer of shingles below the flashing, or merely to add the new layer of shingles on the existing layer and below the flashing. After the new layer of shingles is added below the flashing, the flashing is once again nailed down and sealed.

However, this operation of lifting the flashing becomes difficult, and in fact, may comprise up to one-half or more of the time necessary to install a new roof. Specifically, because the flashing is sealed by tar or the like, and also nailed down at the edge of the roof, it has generally been necessary to use a hammer to impact a chisel, pry bar or like instrument in order to hammer the chisel under the flashing, so as to raise the flashing up. This, however, requires two separate instruments. In performing the operation, the hammer must periodically be replaced in a holder on the roofer's belt or placed down on the roof, in order to use the pry bar to pry up the flashing. This operation becomes burdensome when performed numerous times. Also, if placed on the roof, there is the possibility that the hammer can slide off the roof.

Various devices are known which act as impact hammers along with chisel like ends. Examples of such devices are disclosed in U.S. Design Pat. No. 272,712 to Allen; and U.S. Pat. No. 103,330 to Heusser and U.S. Pat. No. 3,568,657 to Gue. There are also devices that use pry sections on both ends of a pry bar, without a slide hammer. Examples of such devices are disclosed in U.S. Design Pat. No. 136,557 to Scown; and U.S. Pat. Nos. 3,680,834 to Holloway; U.S. Pat. No. 5,577,711 to Shine; and U.S. Pat. No. 5,695,171 to Shine. However, there are no known devices that use pry sections on both ends along with a slide hammer, so that a single tool is provided with a slide hammer with different pry sections.

In addition, although V-shaped notches are known at the side edge of a pry bar, for example, from U.S. Pat. No. 5,695,171 to Shine and U.S. Pat. No. 5,577,711 to Shine, the side notches are not near the front edges, which makes it impossible to remove a nail positioned in a corner near a wall. The same applies to nail retrieval notches, such as that disclosed in U.S. Pat. No. 870,672.

OBJECTS AND SUMMARY OF THE INVENTION

Accordingly, it is an object of the present invention to provide a pry bar with a built in hammer and nail remover for use in roofing that overcomes the problems with the aforementioned prior art.

It is another object of the present invention to provide a pry bar with a built in hammer and nail remover for use in roofing, in which the pry bar and hammer functions are provided in a single tool.

It is still another object of the present invention to provide a pry bar with a built in hammer and nail remover for use in roofing in which a slide hammer functions in place of a separate hammer.

It is yet another object of the present invention to provide a pry bar with a built in hammer and nail remover for use in roofing that has a built in entrapment section for removing and retrieving hard to reach nails.

It is a further object of the present invention to provide a pry bar with a built in hammer and nail remover for use in roofing that is lightweight and durable, and easy and economical to manufacture and use.

In accordance with an aspect of the present invention, a pry bar with a built in hammer includes a slide bar including an elongated linear section, a first pry section at a first end of the elongated linear section and angled relative thereto, the first pry section including a front edge with a notch therein, and a second pry section at a second end of the elongated linear section and angled relative thereto, the second pry section including a front edge with a notch therein; a first stop fixed to the elongated linear section adjacent the first pry section; and a slide hammer slidably mounted on the elongated linear section in order to impact against the first stop.

The first pry section forms an obtuse angle relative to the elongated linear section, and the second pry section forms a right angle relative to the elongated linear section. Each of the first and second pry sections tapers in thickness toward the front edges thereof. Further, each notch has a V-shape.

Also, the elongated linear section has an I-beam cross-section.

A second stop is fixed to the elongated linear section adjacent the second pry section.

In accordance with another aspect of the present invention, a pry bar with a built in hammer includes a slide bar including an elongated linear section, and a first pry section at a first end of the elongated linear section and angled relative thereto, the first pry section including a front edge with a first notch therein, a side edge which meets the front edge at a corner, and a second notch at the side edge immediately adjacent the corner; a first stop fixed to the elongated linear section adjacent the first pry section; a second stop fixed adjacent an opposite end of the elongated linear section; and a slide hammer slidably mounted on the elongated linear section between the first and second stops in order to impact against the first stop.

Also, the first pry section tapers in thickness toward the side edge thereof.

There is also a nail entrapment notch in the side edge which has a polygonal shape.

In accordance with still another aspect of the present invention, a pry bar with a built in hammer includes a slide bar including an elongated linear section, a first pry section at a first end of the elongated linear section and angled relative thereto, the first pry section including a front edge with a first notch therein, a side edge which meets the front edge at a corner, a second notch at the side edge immediately adjacent the corner, and a nail entrapment notch in the side edge, and a second pry section at a second end of the elongated linear section and angled relative thereto, the second pry section including a front edge with a notch therein; a first stop fixed to the elongated linear section adjacent the first pry section; a second stop fixed adjacent to the elongated linear section adjacent the second pry section; and a slide hammer slidably mounted on the elongated linear section between the first and second stops in order to impact against the first stop.

The above and other objects, features and advantages of the invention will become readily apparent from the following detailed description thereof which is to be read in connection with the accompanying drawings.

BRIEF DESCRIPTION THE DRAWINGS

DETAILED DESCRIPTION

Figure 1:
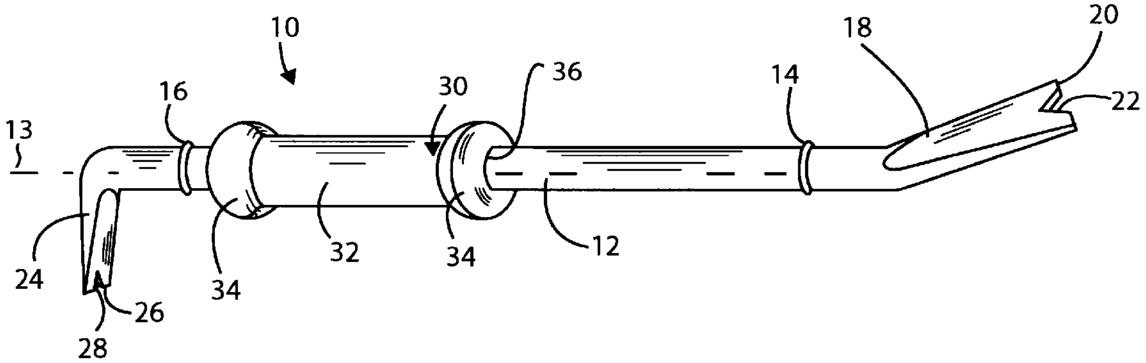
FIG. 1 is a perspective view of a pry bar with a built in hammer and nail remover according to the present invention.

Referring to the drawings in detail, and initially to FIGS. 1–7 thereof, a pry bar 10 with a built in hammer and nail remover according to a first embodiment of the present invention includes an elongated central metal slide bar 12 extending in a linear manner along an axis 13. A first stop 14 is integrally provided at one end of slide bar 12 and a second stop 16 is integrally provided at the other end of slide bar 12. First and second stops 14 and 16 can take the form of circumferential rings extending to a greater diameter than slide bar 12. First and second stops 14 and 16 can be formed as one piece with slide bar 12 or can be secured thereto by welding or any other operation.

Figure 2:
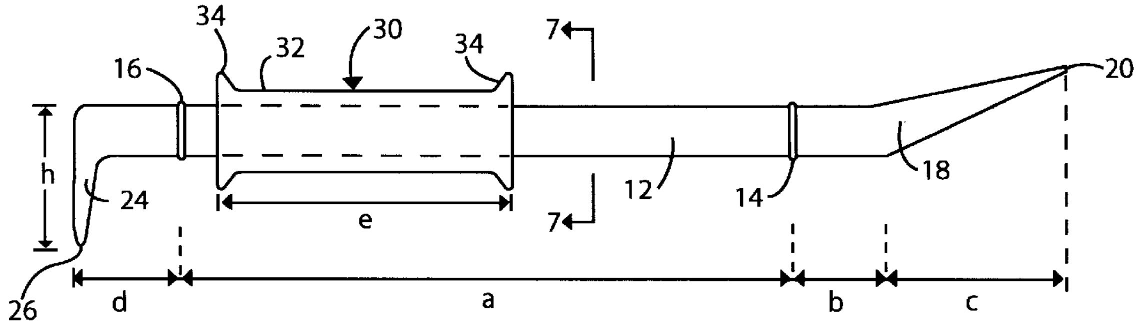
FIG. 2 is a side elevational view of the pry bar with a built in hammer and nail remover.
Figure 3:
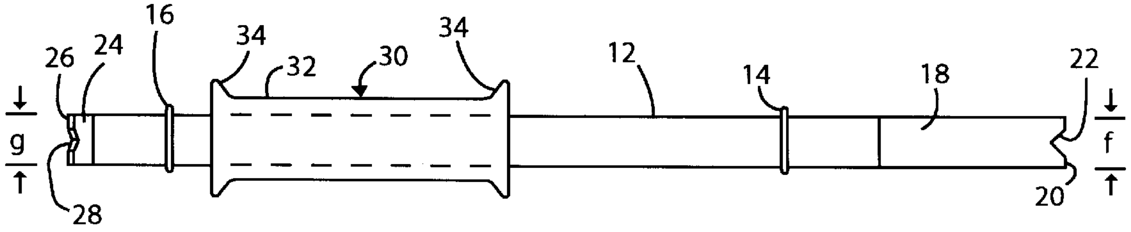
FIG. 3 is a bottom plan view of the pry bar with a built in hammer and nail remover.
Figure 4:
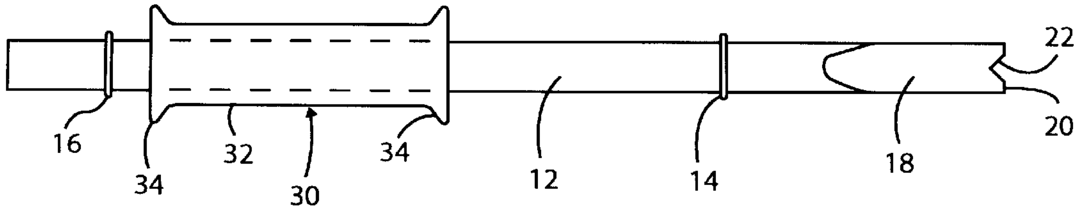
FIG. 4 is a top plan view of the pry bar with a built in hammer and nail remover.
Figure 5:
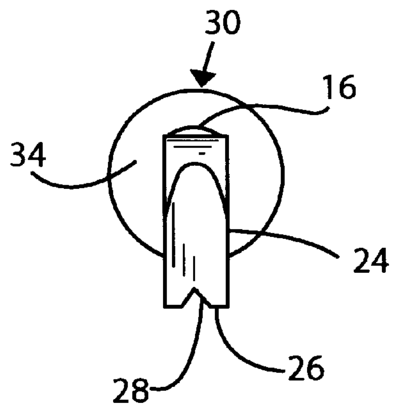
FIG. 5 is a left end elevational view of the pry bar with a built in hammer and nail remover.
Figure 6:
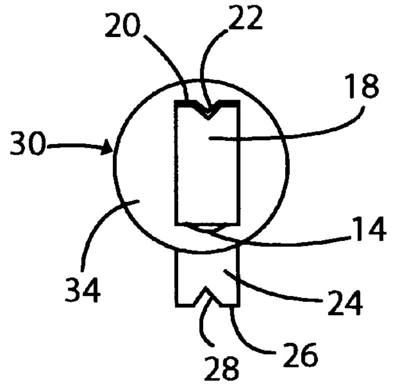
FIG. 6 is a right end elevational view of the pry bar with a built in hammer and nail remover.
Figure 7:
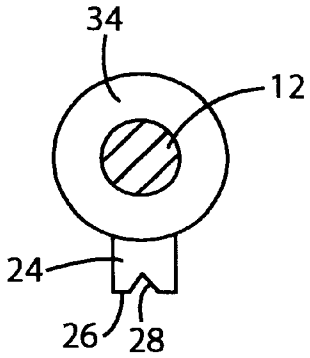
FIG. 7 is a cross-sectional view of the pry bar with a built in hammer and nail remover of FIG. 2, taken along line 7—7 thereof.

The distal end of slide bar 12 adjacent to and to the outside of first stop 14 is formed with a first pry section 18 as a continuation thereof and which tapers down in thickness, as shown best in FIGS. 1 and 2. Pry section 18 is angled upwardly with respect to axis 13 at an obtuse angle, for example, of 135°. However, the present invention is not limited by this angle, and any other suitable obtuse angle can be used.

The front edge 20 of pry section 18 is formed with a centrally located V-shaped notch 22 which is used to receive a nail therein for prying up the nail.

The opposite distal end of slide bar 12 adjacent to and to the outside of first stop 16 is formed with a second pry section 24 as a continuation thereof and which tapers down in thickness, as shown best in FIGS. 1 and 2. Pry section 24 is angled downwardly with respect to axis 13 substantially at a right angle. However, the present invention is not limited by this angle, and any other suitable angle can be used.

The front edge 26 of pry section 24 is also formed with a centrally located V-shaped notch 28 which is used to receive a nail therein for prying up the nail.

In accordance with one aspect of the present invention, a slide hammer 30 is slidably mounted on slide bar 12, and is limited in its movement thereon by first and second stops 14 and 16. Slide hammer 30 is formed as an elongated cylindrical member 32 which is intended to be gripped by a user, along with larger diameter end sections 34. Slide hammer 30 includes a central axial bore 36 that receives slide bar 12 therein so that slide hammer 30 can slide along slide bar 12 between first and second stops 14 and 16.

In operation, when a person is to lift up flashing on a roof, the person inserts pry section 18 beneath the flashing and above the roof and any shingles on the roof. The person then moves slide hammer 30 from the left end in FIG. 1 to the right end in FIG. 1 until the rightmost end section 34 impacts against first stop 14. This has the same effect as a hammer that is hit against a conventional pry bar. However, the entire assembly of the present invention is formed in a single tool, thereby eliminating the need for two separate tools, namely, a hammer and pry bar.

This operation continues for as many impacts as are necessary to raise the flashing up, and thereby raise up the nail or nails holding the flashing down. Once the flashing is sufficiently raised up, pry section 18 or pry section 24 can fit beneath the flashing, so that V-shaped notch 22 or V-shaped notch 28 can be inserted deep enough to receive a nail therein. As a result, either pry section 18 or pry section 24 can be used to fully raise up the flashing so that the nail is fully removed from the roof. The respective notch 22 or 28 can then be positioned between the head of the nail and the upper surface of the flashing to fully remove the nail from the flashing, in order that new shingles can be positioned beneath the flashing.

In a preferred embodiment of the present invention, the following approximate dimensions are preferably applied. The total length of pry bar 10 is 21 inches, broken down as follows: the length "a" of slide bar 12 between stops 14 and 16 is 11 inches; the length "b" of slide bar 12 between first stop 14 and the bend where first pry section 18 starts is 1.5 inches; the length "c" of first pry section 18 measured along axis 13 is 6 inches; and the length "d" from second stop 16 to the end of second pry section 24, measured along axis 13, is 2.5 inches. Also, the length "e" of slide hammer 30 is approximately 6 inches. The widths "f" and "g" of front edges 20 and 26 of pry sections 18 and 24 are each approximately 1⅝ inches, while the length "h" of second pry section 24 extending downwardly is approximately 2¾ inches. However, the present invention is not limited to these dimensions.

Figure 8:
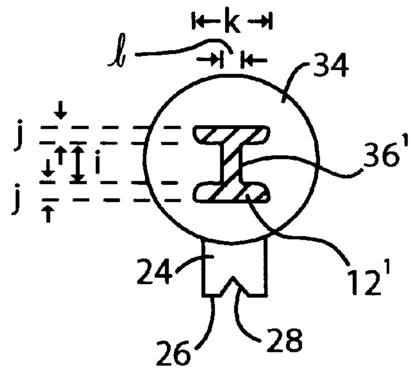
FIG. 8 is a cross-sectional view, similar to FIG. 7, of a pry bar with a built in hammer and nail remover according to a modification of the present invention.

Although slide bar 12 has been shown in a circular cross-sectional configuration, the present invention is not limited thereby. In fact, it is preferable that slide bar has an I-beam shaped configuration, as shown by modified slide bar 12' in FIG. 8. In such case, central axial bore 36' of slide hammer 30 would have a like configuration for sliding on slide bar 12'. This embodiment has the advantage that slide hammer 30 will not rotate while it is sliding. As an example, suitable cross-sectional dimensions of I-beam slide bar 12' are a total height of 1 inch which includes a height "i" of the central section of ½ inch and a height "j" of each of the upper and lower web sections of ¼ inch, a side to side width "k" of each web section of ⅜ inch, and side to side width "l" of the central section of ⅛ inch. However, the present invention is not limited to these dimensions.

Figure 9:
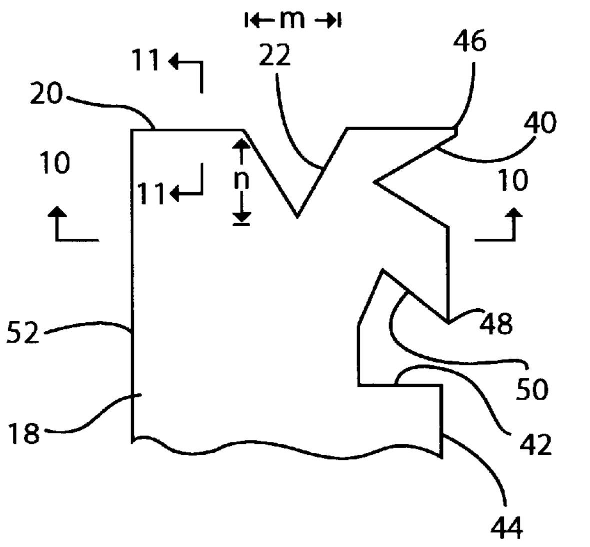
FIG. 9 is a top plan view of a modified pry hammer end according to the present invention.
Figure 10:
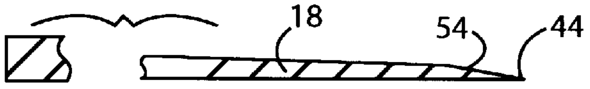
FIG. 10 is a cross-sectional view of the modified pry hammer end of FIG. 9, taken along line 10—10 thereof.
Figure 11:
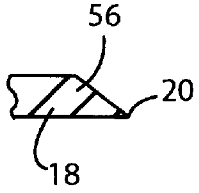
FIG. 11 is a cross-sectional view of the modified pry hammer end of FIG. 9, taken along line 11—11 thereof.

A further embodiment of the present invention is shown in FIGS. 9–11. In this embodiment, in addition to V-shaped notch 22 being formed at front edge 20 of pry section 18, two additional notches 40 and 42 are formed at a side edge 44 of pry section 18. This is the most preferred embodiment of the invention. Notch 40 is also a V-shaped notch and is formed immediately adjacent the corner 46 of front edge 20 and side edge 44. In some situations, a nail is positioned at a corner of the building, where it is impossible to reach with notch 22. By positioning notch 44 adjacent corner 46, such a nail can easily be positioned in notch 44 and pried out. For example, with a side to side width "f" of free edge 20 of pry section 18 being between 1.5 and 2 inches, notches 22 and 40 can have a side to side width "m" of ⅜ inch and a length "n" extending inwardly from free edge 20. However, when the distance "f" of edge 20 is 1.5 inches, this means that there is a distance between notch 22 and corner 46 of slightly greater than ½ inch. On the other hand, notch 40 starts at corner 46, thereby eliminating this distance and permitting the nail at the corner of the building to be easily accessed. However, the present invention is not limited to these dimensions.

In many instances, even if the nail can be lifted up, it cannot be retrieved by the user for removal. In this regard, notch 42 has a polygonal shape, with a reduced dimension entrance 48 and an entrapment area 50 in a V-shape that is perpendicular to the V-shape of notch 40, that is, running parallel to the side edge 44 that will be positioned against the wall, in order to retrieve the nail. In such case, the nail is inserted through reduced dimension entrance 48 and positioned in entrapment area 50. Pry section 18 is then pulled back, thereby carrying the nail in entrapment section 50.

Preferably, pry section 18 tapers down in thickness from side edge 52 toward side edge 44, as shown in FIG. 10, in order to aid in the wedging action when using notch 40 and also to provide a small thickness edge 44 for use in retrieving nails with notch 42. A steeper thickness reducing section 54 can also be provided immediately adjacent side edge 44, as shown in FIG. 10. In like manner, a steep thickness reducing section 56 can be provided immediately adjacent front edge 20, as shown in FIG. 11, to provide a wedging action.

It will therefore be appreciated that pry bar 10 is provided with a built in slide hammer 30 in which the pry section 18 and slide hammer 30 functions are provided in a single tool. In such case, slide hammer 30 functions in place of a separate hammer. In addition, nails close to a wall or corner can also be retrieved and removed by notch 40 and entrapment notch 42.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention defined by the appended claims.

What is claimed is:

1. A pry bar with a built in hammer, comprising:
- a slide bar including:
  - an elongated linear section,
  - a first pry section at a first end of said elongated linear section and angled relative thereto, said first pry section including a front edge with a notch therein, and
  - a second pry section at a second end of said elongated linear section and angled relative thereto, said second pry section including a front edge with a notch therein;
- a first stop fixed to the elongated linear section adjacent the first pry section; and
- a slide hammer slidably mounted on said elongated linear section in order to impact against said first stop.

2. A pry bar according to claim 1, wherein said first pry section forms an obtuse angle relative to said elongated linear section.

3. A pry bar according to claim 1, wherein said second pry section forms a right angle relative to said elongated linear section.

4. A pry bar according to claim 1, wherein each said notch has a V-shape.

5. A pry bar according to claim 1, wherein said elongated linear section has an I-beam cross-section.

6. A pry bar according to claim 1, further comprising a second stop fixed to the elongated linear section adjacent the second pry section.

7. A pry bar according to claim 1, wherein each of said first and second pry sections tapers in thickness toward the front edges thereof.

8. A pry bar with a built in hammer, comprising:
- a slide bar including:
  - an elongated linear section, and
  - a first pry section at a first end of said elongated linear section and angled relative thereto, said first pry section including:
    - a front edge with a first notch therein,
    - a side edge which meets said front edge at a corner, and
    - a second notch at said side edge immediately adjacent said corner;
  - a first stop fixed to the elongated linear section adjacent the first pry section;
  - a second stop fixed adjacent an opposite end of the elongated linear section; and
  - a slide hammer slidably mounted on said elongated linear section between said first and second stops in order to impact against said first stop.

9. A pry bar according to claim 8, wherein said first pry section forms an obtuse angle relative to said elongated linear section.

10. A pry bar according to claim 8, further comprising a second pry section at a second end of said elongated linear section and angled relative thereto, said second pry section including a front edge with a notch therein.

11. A pry bar according to claim 10, wherein said second pry section forms a right angle relative to said elongated linear section.

12. A pry bar according to claim 8, wherein each said notch has a V-shape.

13. A pry bar according to claim 8, wherein said elongated linear section has an I-beam cross-section.

14. A pry bar according to claim 8, wherein said first pry section tapers in thickness toward the front edge thereof.

15. A pry bar according to claim 8, wherein said first pry section tapers in thickness toward said side edge thereof.

16. A pry bar according to claim 8, further comprising a nail entrapment notch in said side edge.

17. A pry bar according to claim 16, wherein said nail entrapment notch has a polygonal shape.

18. A pry bar with a built in hammer, comprising:
- a slide bar including:
  - an elongated linear section, a first pry section at a first end of said elongated linear section and angled relative thereto, said first pry section including:

a front edge with a first notch therein, a side edge which meets said front edge at a corner, a second notch at said side edge immediately adjacent said corner, and a nail entrapment notch in said side edge, and a second pry section at a second end of said elongated linear section and angled relative thereto, said second pry section including a front edge with a notch therein;

a first stop fixed to the elongated linear section adjacent the first pry section;

a second stop fixed adjacent to the elongated linear section adjacent the second pry section; and a slide hammer slidably mounted on said elongated linear section between said first and second stops in order to impact against said first stop.

19. A pry bar according to claim 18, wherein said first pry section forms an obtuse angle relative to said elongated linear section.

20. A pry bar according to claim 18, wherein each of said first and second notches has a V-shape, and said nail entrapment notch has a polygonal shape.

* * * * *